(12) United States Patent
Ibbotson et al.

(10) Patent No.: US 9,414,244 B2
(45) Date of Patent: Aug. 9, 2016

(54) APPARATUS AND METHOD FOR DETERMINING CONTEXT-AWARE AND ADAPTIVE THRESHOLDS IN A COMMUNICATIONS SYSTEM

(71) Applicant: MOTOROLA SOLUTIONS, INC, Schaumburg, IL (US)

(72) Inventors: Craig A Ibbotson, Crystal Lake, IL (US); Shalabh Kakkar, Hoffman Estates, IL (US); Eirene A Shipkowitz-Smith, Deerfield, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 121 days.

(21) Appl. No.: 13/947,472

(22) Filed: Jul. 22, 2013

(65) Prior Publication Data

US 2015/0024735 A1    Jan. 22, 2015

(51) Int. Cl.
*H04W 24/04* (2009.01)
(52) U.S. Cl.
CPC .................................. *H04W 24/04* (2013.01)
(58) Field of Classification Search
CPC .............. H04L 63/1425; H04L 41/142; H04L 41/5009; H04L 43/16; H04W 24/04; H04W 24/08
USPC ......................................................... 455/423
See application file for complete search history.

(56) References Cited

U.S. PATENT DOCUMENTS

| 5,751,964 | A | 5/1998 | Ordanic et al. |
| 6,182,022 | B1 * | 1/2001 | Mayle et al. ................. 702/182 |
| 7,076,695 | B2 | 7/2006 | McGee et al. |
| 7,349,746 | B2 | 3/2008 | Emigholz et al. |
| 7,519,860 | B2 | 4/2009 | Hätönen et al. |
| 7,716,253 | B2 | 5/2010 | Netz et al. |
| 8,032,131 | B2 | 10/2011 | Dobson et al. |
| 8,121,124 | B2 | 2/2012 | Bayka et al. |
| 2004/0039968 | A1 * | 2/2004 | Hatonen et al. ................. 714/39 |
| 2006/0063521 | A1 | 3/2006 | Cheung et al. |
| 2009/0052330 | A1 * | 2/2009 | Matsunaga et al. ........... 370/242 |
| 2010/0330515 | A1 * | 12/2010 | Ueki et al. ....................... 431/22 |
| 2011/0213212 | A1 | 9/2011 | Al-Ali |
| 2012/0051228 | A1 | 3/2012 | Shuman et al. |
| 2012/0066558 | A1 | 3/2012 | Duchenay et al. |

FOREIGN PATENT DOCUMENTS

| WO | 2011009000 A1 | 1/2011 |
| WO | 2013010565 A1 | 1/2013 |

OTHER PUBLICATIONS

Keith Beall et al—AUBE '01—12th International Conference on Automatic Fire Detection, National Institute of Standards and Technology—Mar. 2001—10 pages.

* cited by examiner

*Primary Examiner* — Dinh P Nguyen

(57) ABSTRACT

A system is configured to generate an alarm when an anomaly occurs at a network infrastructure element. The system includes a transceiver configured to receive data associated with a performance indicator on a predefined basis. The system also includes a processor configured to use the received data to determine a normalized trend for the performance indicator for at least one of a given network infrastructure element and a given time period. The processor is further configured to apply a degree of deviation to the determined normalized trend for at least one of the given network infrastructure element and the given time period to generate an adaptive threshold for the performance indicator. An alarm generator generates an alarm to indicate an anomaly at the given network infrastructure element when newly received data associated with the performance indicator is beyond the adaptive threshold associated with the performance indicator.

16 Claims, 4 Drawing Sheets

APPARATUS AND METHOD FOR DETERMINING CONTEXT-AWARE AND ADAPTIVE THRESHOLDS IN A COMMUNICATIONS SYSTEM

BACKGROUND OF THE INVENTION

Narrowband and broadband communications systems are typically used by public safety agencies, for example, emergency first responder organizations, such as police or fire departments, or public works organizations. Examples of narrowband systems include a Land Mobile Radio (LMR) system or a Terrestrial Trunked Radio (TETRA) system. An example of a broadband system is one that operates in accordance with the Long Term Evolution (LTE) signaling standard. Users on narrowband and broadband systems may communicate via mobile or portable user terminals, such as portable narrowband two-way radios, mobile radios, dispatch consoles, laptops, tablets, personal digital assistants (PDA), smart phones, or other similar broadband mobile devices that communicate with one another via wired and/or wireless networks.

Regardless of the type of communication network being used, it is important to determine when system anomalies occur on a network infrastructure. One current method for determining when a service anomaly occurs on a specific network infrastructure is to set a static/predetermined threshold for each parameter that is being evaluated and to compare that predetermined threshold against statistical values retrieved for that parameter. If a retrieved statistical value is beyond (for example, greater than or less than) the predetermined threshold associated with a parameter, an alarm is typically raised to indicate a potential service anomaly. Consider an example where a statistical value associated with a percentage of dropped calls is reported for each sector in each cell site in a communication system. The reported percentage from each cell site or each sector is compared against a predetermined threshold set for the percentage of dropped calls. If, for example, the predetermined threshold for the percentage of dropped calls is set at ten percent, when any cell site or sector reports a percentage of dropped calls greater than ten percent, the system may determine that an anomaly has occurred at that cell site or sector and an alarm may be raised to indicate the anomaly.

The problem with this approach is it is difficult to set one system wide threshold for a given parameter because use of a network component may vary. For example, some cell sites may be in urban areas with high density and other cell sites may be in rural areas with larger coverage areas. It may therefore be considered "normal" for those cell sites with larger coverage areas to have a larger percentage of dropped calls than those cell sites with smaller coverage areas. Therefore, when a single threshold is set for the entire system, there may be a high number of false alarms in cell sites with a normally large percentage of dropped calls. One way to overcome generating a high number of false alarms is to set the predetermined threshold for each parameter to a value associated with catastrophe. In other words, the threshold may be set to a value that is high so that no alarms will be issued unless a catastrophe occurs. This approach clearly leads to a situation where performance degradation not rising to a catastrophic level will likely go unnoticed.

As an alternative, a predetermined threshold value may be set for each network component being evaluated. For example, a separate predetermined threshold may be set of each parameter associated with each cell site and also for given time periods, for example, a busy hour such as 9:00 am-10:00 am on a weekday versus a non-busy hour such as the same period on the weekend. Setting a separate predetermined threshold value for each network component exponentially increases the number of thresholds that have to be managed. Maintaining large numbers of predetermined thresholds is problematic because as communications systems expand with additional infrastructure, users, and/or services, the static thresholds are likely to become obsolete and must be updated to account for the dynamic changes in a communication system. In addition, there is no clear avenue for determining a value that is to be assigned to each predetermined threshold.

Accordingly, there is a need for an apparatus and method for determining context aware and adaptive thresholds in a communications system.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
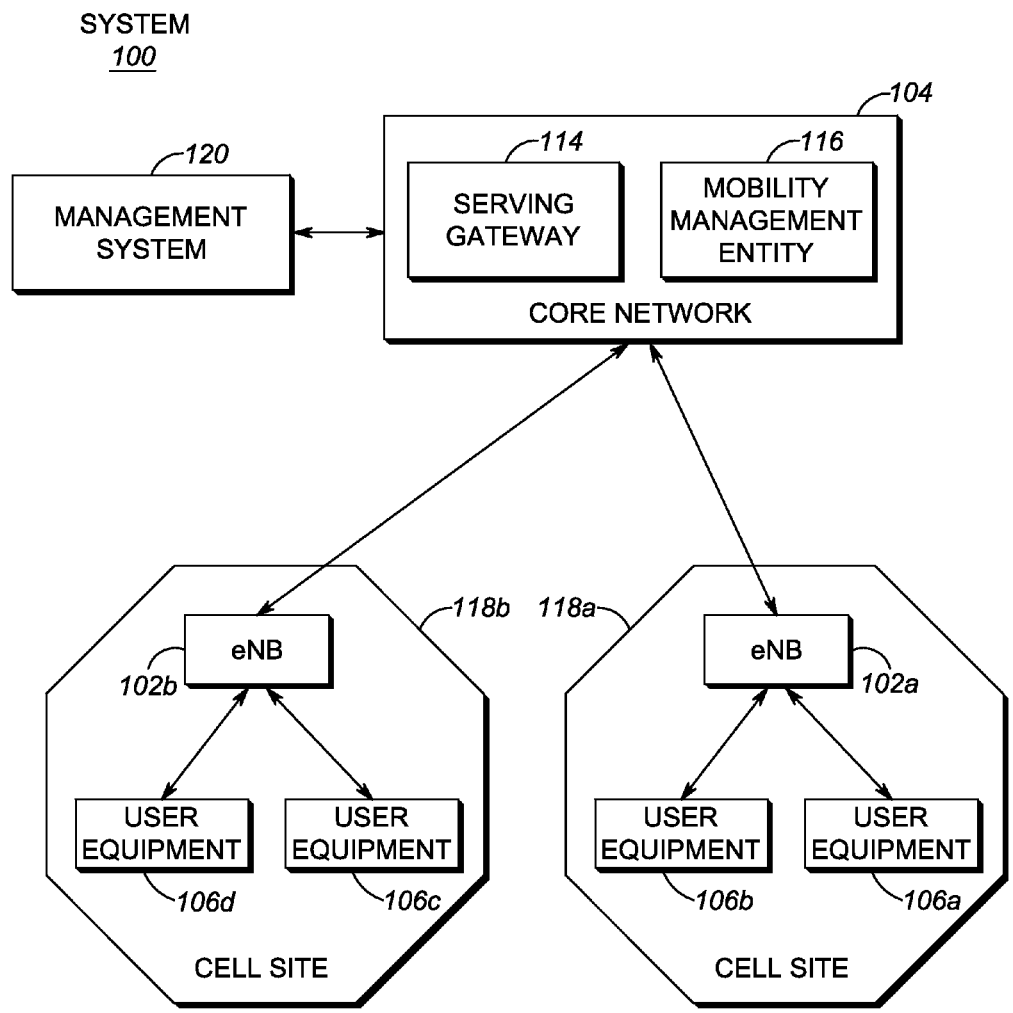
FIG. 1 is a block diagram of a system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to methods and systems for generating an alarm when an anomaly occurs at a network infrastructure element. The system includes a transceiver configured to receive data associated with a performance indicator on a predefined basis. The system also includes a processor configured to use the received data to determine a normalized trend for the performance indicator for at least one of a given network infrastructure element and a given time period. The processor is further configured to apply a degree of deviation to the determined normalized trend for at least one of the given network infrastructure element and the given time period to calculate an adaptive threshold for the performance indicator. An alarm generator generates an alarm to indicate an anomaly at the given network infrastructure element when newly received data associated with the performance indicator is beyond the adaptive threshold associated with the performance indicator.

FIG. 1 is a block diagram of a system used in accordance with some embodiments. System 100 illustrates elements of a Long Term Evolution (LTE) system, although any broadband or narrowband system may be used. System 100 includes multiple evolved Node Bs (eNBs) 102 (that is, eNBs 102a and 102b), each of which communicates directly with a core network 104 and with one or more user equipment 106 (that is, user equipment 106a-106d), such as mobile phones, smart phones, tablets or laptops. Core network 104 includes a serving gateway 114 and a mobility management entity 116. Serving gateway 114 routes incoming and outgoing internet protocol (IP) packets and anchors handover between eNBs 102. Mobility management entity 116 handles signaling related to mobility and security. System 100 also includes a management system 120 which collects key performance indicator (KPI) data and generates adaptive thresholds for each KPI being measured in the communication system during a particular time frame. Although FIG. 1 shows a broadband system, embodiments may be implemented in any broadband, narrowband or ad hoc communications system.

Each eNB 102 provides coverage to one or more cells and manages radio resources and mobility in corresponding cell sites 118 (that is, cell sites 118a and 118b) to optimize communication with connected user equipment 106. For example, eNB 102a provides coverage to one or more cells (not shown) associated with cell site 118a and eNB 102b provides coverage to one or more cells (not shown) associated with cell site 118b. Therefore, user equipment 106 in each cell sends information to and receives information from core network 104 through the eNB 102 in the cell in which the user equipment operates.

In some embodiments, management system 120 is configured to monitor one or more KPIs being measured at a specific network infrastructure element. Non-limiting examples of KPIs that may be measured at a network infrastructure element (for example, serving gateway 114, mobility management entity 116, eNB 102, or one or more cells in cell sites 118) include performance indicators for a connection establishment success rate, a connection drop rate, a handover success rate, throughput, a block error rate, a call drop rate and cell unavailability. Management system 120 collects data associated with each KPI measured at a network infrastructure element over a predefined time period, determines a normalized trend for each KPI over the predefined time period, calculates an adaptive threshold for each KPI based on the normalized trend for that KPI, and generates an alarm when an incoming data associated a KPI goes beyond the adaptive threshold.

Figure 2:
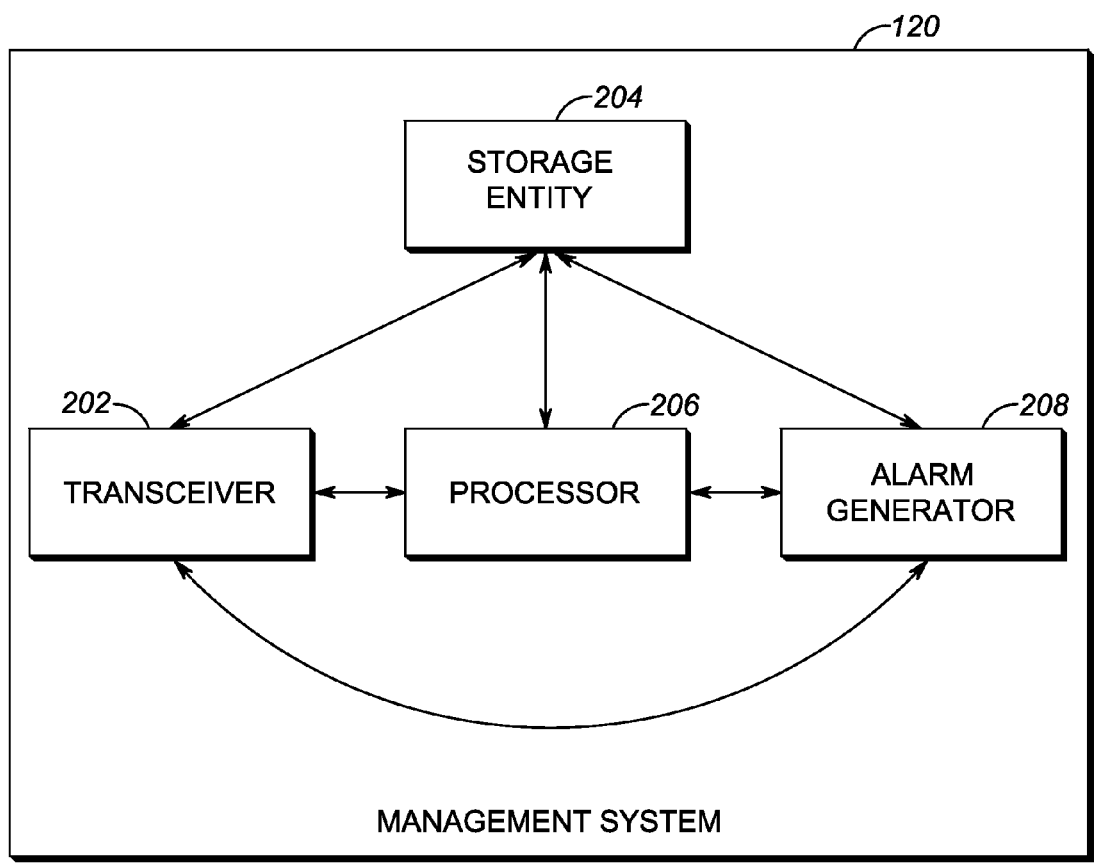
FIG. 2 is a block diagram of a management system used in accordance with some embodiments.

FIG. 2 is a block diagram of management system 120 in accordance with some embodiments. Management system 120 includes a transceiver 202, a storage entity 204, a processor 206, and an alarm generator 208. Transceiver 202 is configured to receive, over a period of time, data associated with each KPI being measured at a network infrastructure element on a predefined basis. For instance, every fifteen minutes or at the same time every day, transceiver 202 may receive data for measuring the throughput at one or more cells in each cell site 118. The measurement data may be collected for a predefined time period, for example, every hour or daily. The collected KPI data are stored in storage entity 204 in association with the KPI.

Using the collected data associated with a particular KPI, processor 206 is configured to calculate a normalized trend and associate the normalized trend for that KPI with the particular network infrastructure element that provided the collected data and/or time period during which the data was collected. The normalized trend may be calculated by, for example, averaging previously received statistical data associated with the KPI over a given time period. In another example, the normalized trend may be calculated by averaging a subset of the previously received statistical data associated with the KPI over a given time period or by using a median or mode of the previously received statistical data associated with the KPI over a given time period. Using the example, where transceiver 202 receives data measuring the throughput of one or more cells in a cell site 118, processor 206 may use throughput data collected from each of cell sites 118a and 118b over a predefined time period, for example, one week, to calculate a normalized trend for throughput at each of cell sites 118a and 118b. Processor 206 may also calculate normalized trends for specific time periods. For example, processor 206 may use throughput data collected at a first, specific time period, for example from 9-10 am on weekdays, from one or more cells in cell sites 118a and 118b over a second, predefined period of time, for example, over one or more weeks, to calculate a normalized trend for throughput at each of the one or more cells in cell sites 118a and 118b at that specific time period (i.e., 9-10 am).

Processor 206 then calculates an adaptive threshold for each KPI associated with a given infrastructure and/or a given time period by applying a degree of deviation to the normalized trend associated with that KPI. Using an example where the percentage of dropped calls is a KPI being monitored by management system 120, processor 206 may use the normalized trend calculated for the percentage of dropped calls at one or more cells in cell site 118a and/or 118b to calculate an adaptive threshold for measuring the percentage of dropped calls at each of the cells in cell site 118a and/or 118b over a given period of time. Consider the example where one cell in cell site 118a reports that on average three percent of the calls at that cell were dropped between 9-10 am on weekdays for the past five week days and one cell in cell site 118b reports that on average five percent of the calls at that site were dropped between 9-10 am on weekdays for the past five week days. Using this information, processor 206 may apply a twenty five percent deviation to the three percent average reported by the cell in cell site 118a to calculate an adaptive threshold for the percentage of dropped calls at the cell in cell site 118a at 3.75 percent. Similarly, processor 206 may apply a twenty five percent deviation to the five percent average reported by the cell in cell site 118b to calculate an adaptive threshold for the percentage of dropped calls at the cell in cell site 118b at 6.25 percent. Alternatively, processor 206 may calculate a system-wide normalized trend by, for example, averaging the three percent average for the cell in cell site 118a and the five percent average for the cell in cell site 118b to obtain an overall four percent average. Processor 206 may apply a twenty five percent deviation (or any other suitable deviation) to the overall four percent average to calculate an adaptive threshold for the percentage of dropped calls at the two cell in cell sites 118a and 118b at five percent.

As transceiver 202 receives new data for the measured KPI, processor 206 may calculate/update the normalized trend for the KPI. Therefore, the adaptive thresholds generated by processor 206 are subject to change with the usage or service patterns of a particular infrastructure component. Furthermore, processor 206 may be configured to continuously evaluate batches of statistical data associated with a measured KPI to show deviations from the normalized trend. The deviations may be compiled in, for example, a table or shown on a geographical map to highlight degradation at specific infrastructure components.

Alarm generator 208 may send an alarm to indicate an anomaly at a network infrastructure element when a newly received KPI value or set of values is beyond (for example, above or below) the current adaptive threshold associated with the measured KPI. Continuing with the example where the current adaptive threshold is calculated for the percentage of dropped calls at two cells in cell sites 118a and 108b, alarm generator 208 may send an alarm to indicate an anomaly at the cell in cell site 118a, when the cell in cell site 118a reports that the percentage of dropped calls for a time period being measured is above the computed threshold, i.e., 3.75 percent. Using this system, alarm generator 208 is configured to send an alarm when there is noticeable degradation in service, even if that degradation does not rise to a catastrophic level. Management system 120 therefore eliminates false alarms associated with outdated thresholds and eliminates the need for continual and manual reconfiguration of performance thresholds.

Figure 3:
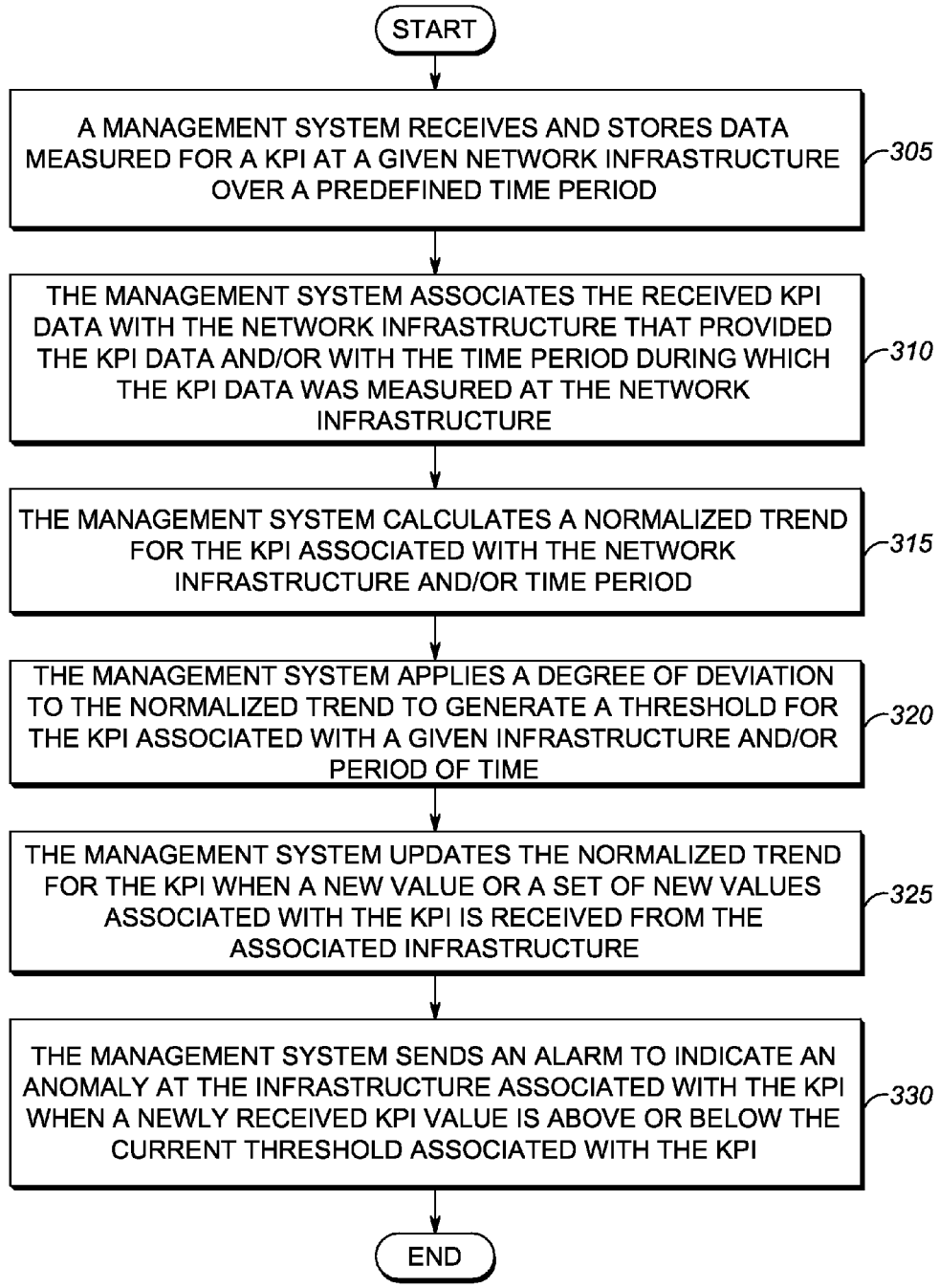
FIG. 3 is a flow diagram of steps implemented in accordance with some embodiments.

FIG. 3 is a flow diagram of steps implemented in accordance with some embodiments. At 305, management system 120 receives and stores data measured for a KPI at a given network infrastructure element over a predefined time period. At 310, management system 120 associates the received KPI data with the network infrastructure element that provided the KPI data and/or with the time period during which the KPI data was measured at the network infrastructure. At 315, management system 120 calculates a normalized trend for the KPI associated with the network infrastructure element and/or time period. At 320, management system 120 applies a degree of deviation to the normalized trend to calculate a threshold for the KPI associated with a given infrastructure and/or period of time. At 325, management system 120 updates, that is, re-computes, the normalized trend for the KPI when a new value or a set of new values associated with the KPI is received from the associated infrastructure element. At 330, management system 120 sends an alarm to indicate an anomaly at the infrastructure element associated with the KPI when a newly received KPI value is above or below the current threshold associated with the KPI.

Figure 4:
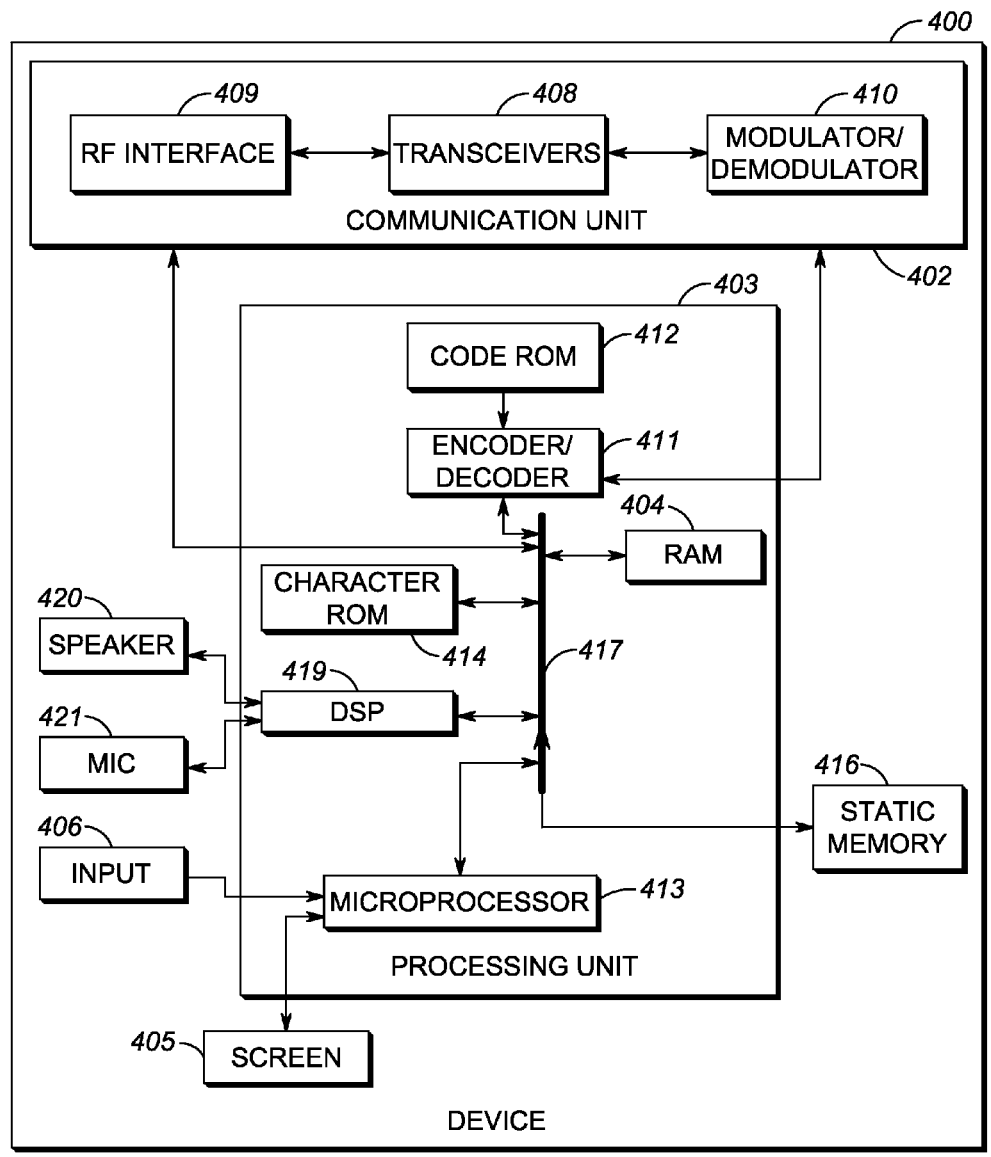
FIG. 4 is a block diagram of a computing device that is configured to generate an alarm in accordance with some embodiments.

FIG. 4 is a block diagram of a computing device, such as management system 120, that is configured to generate an alarm in accordance with some embodiments. The computing device may be, for example, a server connected to a network. The computing device includes a communications unit 402 coupled to a common data and address bus 417 of a processing unit 403. The computing device may also include an input unit (e.g., keypad, pointing device, mouse, etc.) 406, an output transducer unit (e.g., speaker) 420, an input transducer unit (e.g., a microphone) (MIC) 421, and a display screen 405, each coupled to be in communication with the processing unit 403.

The processing unit 403 may be configured to perform the steps described in FIG. 3 and perform the functions of processor 206 and/or alarm generator 208. The processing unit 403 may also include an encoder/decoder 411 with an associated code ROM 412 for storing data for encoding and decoding voice, data, control, or other signals that may be transmitted or received by the computing device. The processing unit 403 may further include a microprocessor 413 coupled, by the common data and address bus 417, to the encoder/decoder 411, a character ROM 414, a RAM 404, and a static memory 416. The processing unit 403 may also include a digital signal processor (DSP) 419, coupled to the speaker 420, the microphone 421, and the common data and address bus 417, for operating on audio signals received from one or more of the communications unit 402, the static memory 416, and the microphone 421.

The communications unit 402 may include an RF interface 409 configurable to communicate with network components, and other user equipment within its communication range. The communications unit 402 may include one or more broadband and/or narrowband transceivers 408, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. The communications unit 402 may include one or more local area network or personal area network transceivers such as Wi-Fi transceiver perhaps operating in accordance with an IEEE 802.11 standard (e.g., 802.11a, 802.11b, 802.11g), or a Bluetooth transceiver, for subscriber device to subscriber device communications. The transceivers may be coupled to a combined modulator/demodulator 410 that is coupled to the encoder/decoder 411. The character ROM 414 stores code for decoding or encoding data such as control, request, or instruction messages, channel change messages, and/or data or voice messages that may be transmitted or received by the computing device. Static memory 416 may store operating code associated with operating the computing device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A wireless infrastructure management system comprising:
   a transceiver configured to receive performance data associated with a performance indicator for a given network infrastructure element on a predefined basis;
   a processor configured to use the received performance data to determine a plurality of normalized trends for the performance indicator of the given network infrastructure element for a plurality of respective recurring discrete time periods, each determined normalized trend associated with a respective one of each of the plurality of respective recurring discrete time periods, and configured to apply a degree of deviation to each of the plurality of determined normalized trends to generate respective adaptive thresholds for the performance indicator for each of the plurality of respective recurring discrete time periods; and
   an alarm generator configured to generate an alarm to indicate an anomaly at the given network infrastructure element during a particular one of the plurality of respective recurring discrete time periods when new performance data associated with the performance indicator and received during the particular respective recurring discrete time period is beyond the generated respective adaptive threshold for the performance indicator and the particular respective recurring discrete time period.

2. The management system of claim 1, wherein the processor is configured to update a particular one of the plurality of normalized trends for the performance indicator of the given network infrastructure element and for the particular respective recurring discrete time period subsequent to receiving the new performance data.

3. The management system of claim 1, wherein the given network infrastructure element is a network infrastructure element that sent the performance data.

4. The management system of claim 1, wherein the particular respective recurring discrete time period is a discrete time period of day during which the performance data was measured at the given network infrastructure element.

5. The management system of claim 1, further comprising a storage entity configured to store the received performance data in association with the performance indicator and the particular respective recurring discrete time period.

6. The management system of claim 1, wherein the processor is configured to calculate each normalized trend for the performance indicator based on performance data received from a plurality of network infrastructure elements.

7. The management system of claim 1, wherein the processor is further configured to evaluate statistical performance data associated with the performance indicator to show deviations from the normalized trend for each of the plurality of respective recurring discrete time periods.

8. A method for managing wireless infrastructure, the method comprising:
   receiving, by a management system, performance data associated with a performance indicator for a given network infrastructure element on a predefined basis;
   using the received performance data, by the management system, to determine a plurality of normalized trends for the performance indicator for the given network infrastructure element for a plurality of respective recurring discrete time periods, each determined normalized trend associated with a respective one of each of the plurality of respective recurring discrete time periods;
   applying, by the management system, a degree of deviation to each of the plurality of determined normalized trends to generate
   respective adaptive thresholds for the performance indicator for each of the plurality of respective recurring discrete time periods; and
   receiving new performance data associated with the performance indicator and received during a particular one of the plurality of respective recurring discrete time periods, and subsequently generating, by the management system, an alarm to indicate an anomaly at the given network infrastructure element when the new performance data is beyond the generated respective adaptive threshold for the performance indicator and the particular respective recurring discrete time period.

9. The method of claim 8, the method further comprising updating a particular one of the plurality of normalized trends for the performance indicator of the given network infrastructure element and for the particular respective recurring discrete time period subsequent to receiving the new performance data.

10. The method of claim 8, wherein the given network infrastructure element is a network infrastructure element that sent the performance data.

11. The method of claim 8, wherein the particular respective recurring discrete time period is a time period during which the performance data was measured at the given network infrastructure element.

12. The management system of claim 4, wherein the plurality of normalized trends for the performance indicator and the respective recurring discrete time periods are determined using performance data received during respective recurring discrete time periods of day over a plurality of days.

13. The method of claim 8, wherein the plurality of normalized trends for the performance indicator and the respective recurring discrete time periods are determined using performance data received during respective recurring discrete time periods of day over a plurality of days.

14. The management system of claim 4, wherein each respective recurring discrete time period of day is a particular hour of day.

15. The method of claim 8, wherein the particular respective recurring discrete time period is a respective recurring discrete time period of day during which the performance data was measured at the given network infrastructure element.

16. The method of claim 15, wherein the respective recurring discrete time period of day is a particular hour of day.

* * * * *